(12) United States Patent
Iliadis et al.

(10) Patent No.: US 10,353,608 B2
(45) Date of Patent: Jul. 16, 2019

(54) DEVICE AND METHOD FOR DETERMINING A NUMBER OF STORAGE DEVICES FOR EACH OF A PLURALITY OF STORAGE TIERS AND AN ASSIGNMENT OF DATA TO BE STORED IN THE PLURALITY OF STORAGE TIERS

(71) Applicant: INTERNATIONAL BUSINESS MACHINES CORPORATION, Armonk, NY (US)

(72) Inventors: Ilias Iliadis, Rueschlikon (CH); Jens Jelitto, Rueschlikon (CH); Yusik Kim, Amsterdam (NL); Slavisa Sarafijanovic, Adliswil (CH); Vinodh Venkatesan, Horgen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 14/819,622

(22) Filed: Aug. 6, 2015

(65) Prior Publication Data
US 2016/0048355 A1   Feb. 18, 2016

(30) Foreign Application Priority Data
Aug. 15, 2014   (GB) .................................. 1414485.1

(51) Int. Cl.
*G06F 12/06*   (2006.01)
*G06F 3/06*   (2006.01)

(52) U.S. Cl.
CPC .......... *G06F 3/0631* (2013.01); *G06F 3/0605* (2013.01); *G06F 3/0607* (2013.01);
(Continued)

(58) Field of Classification Search
CPC ... G06F 12/023; G06F 12/0608; G06F 12/067
See application file for complete search history.

(56) References Cited

U.S. PATENT DOCUMENTS 7,631,155 B1 * 12/2009 Bono .................... G06F 3/0608
                                                              707/999.202
8,433,848 B1    4/2013 Lefferts et al.
(Continued)

OTHER PUBLICATIONS

Foh, Chuan Heng et al., Optimal Disk Storage Allocation for Multi-tier Storage System, APMRC, 2012 Digest, Oct. 31, 2012, p. 1-7, IEEE, Singapore. http://ieeexplore.ieee.org/xpl/articleDetails.jsp?tp=&arnumber=6401689&url=http%3A%2F%2Fieeexplore.ieee.org%2Fiel5%2F6383193%2F6401675%2F06401689.pdf%3Farnumber%3D6401689.

(Continued)

*Primary Examiner* — Ryan Bertram
*Assistant Examiner* — Trang K Ta
(74) *Attorney, Agent, or Firm* — Griffiths & Seaton PLLC

(57) ABSTRACT

A device and method for determining number of storage devices for each of plurality of storage tiers and assignment of data to be stored in the plurality of storage tiers. The device computes an optimized number of storage devices for each tier including a classifier, which receives units as input data to be stored in the system. Based on the characteristics of the storage devices, the device outputs a data-unit-to-storage tier assignment. An optimizer receives data-unit-to-storage tier assignment from the classifier and a cost budget for the system. Thereafter, an output for the number of storage devices for each storage tier is calculated. A method for determining number of storage devices for each of a plurality of storage tiers and assignment of data to be stored in the plurality of storage tiers are also provided.

10 Claims, 3 Drawing Sheets

(52) U.S. Cl.
CPC .......... *G06F 3/0649* (2013.01); *G06F 3/0683* (2013.01); *G06F 3/0685* (2013.01)

(56) References Cited

U.S. PATENT DOCUMENTS

| | | | |
|---|---|---|---|
| 8,566,553 B1 | 10/2013 | Marshak et al. | |
| 8,935,493 B1* | 1/2015 | Dolan | G06F 3/0649 |
| | | | 711/117 |
| 9,246,986 B1* | 1/2016 | Ward, Jr. | H04L 67/10 |
| 2001/0044879 A1* | 11/2001 | Moulton | G06F 3/0617 |
| | | | 711/114 |
| 2002/0184442 A1 | 12/2002 | Alvarez et al. | |
| 2011/0010514 A1 | 1/2011 | Benhase et al. | |
| 2011/0314246 A1 | 12/2011 | Cargille et al. | |
| 2012/0203999 A1 | 8/2012 | Jess | |
| 2012/0303929 A1 | 11/2012 | Chiu et al. | |
| 2013/0080703 A1 | 3/2013 | Abe et al. | |
| 2013/0151804 A1 | 6/2013 | Alatorre et al. | |
| 2013/0159359 A1* | 6/2013 | Kumar | G06F 3/0605 |
| | | | 707/822 |
| 2013/0185229 A1* | 7/2013 | Naga | G06F 12/123 |
| | | | 705/418 |
| 2013/0198449 A1* | 8/2013 | Belluomini | G06F 3/0604 |
| | | | 711/114 |
| 2014/0324920 A1* | 10/2014 | Hamilton | G06F 17/30312 |
| | | | 707/812 |

OTHER PUBLICATIONS

Alshawabkeh, Malak et al., Automated Storage Tiering Using Markov Chain Correlation Based Clustering, Machine Learning and Applications (ICMLA), 2012 11th International Conference, Dec. 12, 2012, p. 392-397, IEEE, Boca Raton, FL. http://ieeexplore.ieee.org/xpl/articleDetails.jsp?tp=&arnumber=6406694&url=http%3A%2F%2Fieeexplore.ieee.org%2Fie15%2F6403616%2F6406569%2F06406694.pdf%3Farnumber%3D6406694.

* cited by examiner

DEVICE AND METHOD FOR DETERMINING A NUMBER OF STORAGE DEVICES FOR EACH OF A PLURALITY OF STORAGE TIERS AND AN ASSIGNMENT OF DATA TO BE STORED IN THE PLURALITY OF STORAGE TIERS

CROSS-REFERENCE TO RELATED APPLICATION

This application claims the benefit of priority from United Kingdom Patent Application No. 1414485.1, filed Aug. 15, 2014, the contents of which are incorporated herein by reference.

FIELD OF THE INVENTION

The invention relates to a device and to a method for determining a number of storage devices for each of a plurality of storage tiers of a tiered storage system and for determining an assignment of data to be stored in the plurality of storage tiers.

BACKGROUND

Modern storage systems are typically composed of multiple different types of storage devices, each storage device type having different device characteristics. This can be used to match the data workload characteristics and requirements to the most appropriate storage device. For instance, when the budget is limited, frequently accessed data can justify the higher cost of a low latency storage device whereas rarely accessed data can be placed on a lower cost device with higher latency.

However, due to different prices, storage capacities and data write and/or read performance for various storage device types available on the market, and due to various data workloads, it can be difficult to dimension or configure a tiered storage system and data placement within a tiered storage system. Further, although it might be simple to optimally choose a device for a single data unit, the assignment of all data units to the tiers of the tiered storage system and the dimensioning of the tiers are inter-dependent and need to take the budget or performance requirements into account. Optimal match-making is combinatorial in nature and therefore it can be quite difficult to optimize the dimensioning and data placement of a tiered storage system. One approach could be to enumerate all combinations of data units to tier assignments and evaluate the system performance metric that is to be optimized, which could be the system response time. In a large scale storage system with millions or billions of data units this enumeration and evaluation is not tractable. A straightforward mathematical approach could be to formulate a combinatorial optimization problem which is computationally intractable under the vast majority of relevant performance metric objectives. Multi-tier storage systems are for example disclosed in US 2013/0198449 A1, US 2012/0303929 A1, US 2012/0203999 A1, US 2013/0151804 A1, US 2011/0010514 A1, and U.S. Pat. No. 8,566,553 B1.

In common systems, various heuristics are used in practice that might often result in significantly higher system costs or lower system performance. For the most relevant performance metrics, such as system average response time, or weighted response time, or queuing time, a straightforward modelling of the above described problem can result in a non-linear optimization problem that cannot be easily solved or does not scale feasibly with the amount of data. If the system load is used, which is yet another common performance metric, certain approximations or heuristics can lead to a linear problem that can be solved, but the resulting solution can be far from optimal for many other metrics that better indicate system performance.

Another approach is based on minimizing the cost subject to load constraints which results in a linear problem but this approach cannot be used to optimize for important delay related metrics.

Accordingly, it is an aspect of the present invention to improve the assignment of data to tiers and the dimensioning of tiers within a tiered storage system.

SUMMARY OF THE INVENTION

The present invention provides a device for determining a number of storage devices for each of a plurality of storage tiers of a tiered storage system and for determining an assignment of data to be stored in the plurality of storage tiers. The device includes: i) a reconfigurable classifier unit being configured to receive a first set of parameters indicating characteristics of the data to be stored and indicating characteristics of the storage devices and a second set of parameters indicating classifier unit configuration parameters, and to determine an assignment of the data to the plurality of storage tiers based on the first set of parameters and the second set of parameters; ii) a dimensioning unit being configured to receive a cost value and the assignment of the data to the plurality of storage tiers, and to determine a number of storage devices for each of the plurality of storage tiers based on the determined assignment, the received cost value, and a performance metric, and to estimate a value of the performance metric based on the determined assignment and the determined number of storage devices; iii) a classifier reconfiguration unit being configured to determine the second set of parameters, and to provide the second set of parameters to the reconfigurable classifier unit, wherein the reconfigurable classifier unit is configured to adapt the assignment of the data to the plurality of storage tiers based on the first set of parameters and the second set of parameters.

The present invention also provides a method for determining a number of storage devices for each of a plurality of storage tiers of a tiered storage system and for determining an assignment of data to be stored in the plurality of storage tiers. The method includes the following steps: receiving a first set of parameters indicating characteristics of the data to be stored and indicating characteristics of the storage devices, determining a second set of parameters indicating classifier unit configuration parameters, determining an assignment of the data to the plurality of storage tiers based on the first set of parameters and the second set of parameters, receiving a cost value, determining a number of storage devices for each of the plurality of storage tiers based on the determined assignment and the received cost value and a performance metric, estimating a value of the performance metric based on the determined assignment and the determined number of storage devices, determining the second set of parameters, providing the second set of parameters to the reconfigurable classifier unit, and adapting the assignment of the data to the plurality of storage tiers based on the first set of parameters and the second set of parameters.

The present invention also provides a non-transitory computer program product including a program code for executing the steps of the method for determining a number of storage devices each of a plurality of storage tiers of a tiered storage system and for determining an assignment of data to be stored in the plurality of storage tiers when run on at least one computer including the steps of the above method.

Certain embodiments of the presented device, the tiered storage system, the determination method or the computer program product can include individual or combined features, method steps or aspects as mentioned above or below with respect to exemplary embodiments.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION OF THE PREFERRED EMBODIMENTS

Figure 1:
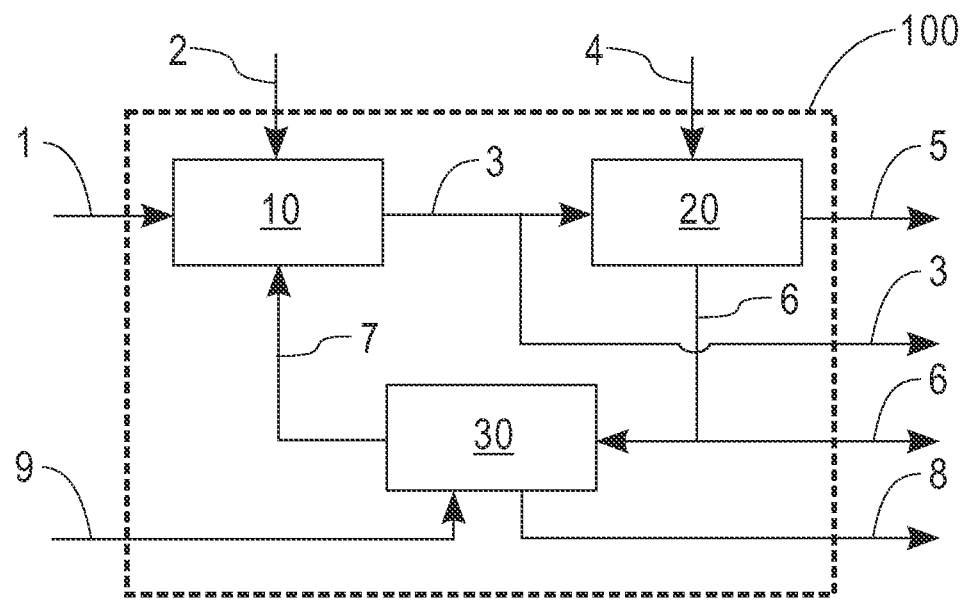
FIG. 1 shows an embodiment of a device for determining a number of storage devices for each of a plurality of storage tiers of a tiered storage system and for determining an assignment of data to be stored in the plurality of storage tiers.

FIG. 1 is a simplified schematic of a device 100 for determining a number 5 of storage devices 40, 50, 60, 70 (see FIG. 2) for each of a plurality of storage tiers of a tiered storage system 200 and for determining an assignment 3 of data to be stored in the plurality of storage tiers.

The device 100 includes a reconfigurable classifier unit 10, a dimensioning unit 20 and a classifier reconfiguration unit 30. These units 10, 20, 30 form a control loop for determining and optimizing the number 5 of storage devices 40, 50, 60, 70 and for determining and optimizing the assignment 3 of data to the storage tiers. When the classifier reconfiguration unit 30 determines that a termination condition of the control loop is fulfilled, the classifier reconfiguration unit 30 can output a signal 8 indicating this fact.

When the control loop is finished, an optimized number 5 of storage devices 40, 50, 60, 70 is assigned to each storage tier. The number of storage tiers also depends on the number of different kind of storage devices 40, 50, 60, 70 needed for the data to be stored as each storage tier includes storage devices 40, 50, 60, 70 of one kind. Further, an optimized assignment 3 of data to the different tiers is provided.

In order to achieve this optimization, the reconfigurable classifier unit receives a first set of parameters. The first set of parameters consists of parameters 1 indicating characteristics of the data to be stored and parameters 2 indicating characteristics of the storage devices 40, 50, 60, 70.

The classifier reconfiguration unit 30 determines (initializes or updates) a second set of parameters 7. The second set of parameters 7 consists of the classifier unit configuration parameters, used to configure or reconfigure the classifier unit. For determining the second set of parameters 7, the estimated performance metric value 6 can be used when available, and one-time or interactive user input or a predefined rule 9 can be used for restricting the space of the second set of parameters or for defining discretization or sampling rules for the second set of parameters.

The reconfigurable classifier unit 10 uses a utility function for determining an assignment 3 of the data to the plurality of storage tiers based on the first set of parameters 1, 2 and the second set of parameters 7. The output of the reconfigurable classifier unit 10 represents the data-to-tier assignment 3. This is input to the dimensioning unit 20 which further receives a cost value 4. The cost value 4 can be a budget for the tiered storage system, a maximum number of storage devices being available, or the like.

The dimensioning unit 20 determines a number 5 of storage devices 40, 50, 60, 70 for each of the plurality of storage tiers based on the determined assignment 3, the received cost value 4, and a performance metric of interest, and estimates the performance metric value 6 based on the determined assignment 3 and the determined number 5 of storage devices 40, 50, 60, 70.

The control loop is maintained by using the updated outputs of the device units 10, 20, 30 as the new inputs of the device units 20, 30, 10, respectively, until a termination condition is satisfied. When the termination condition is satisfied, a signal 8 can be output to indicate this fact to the tiered storage system 200.

Figure 2:
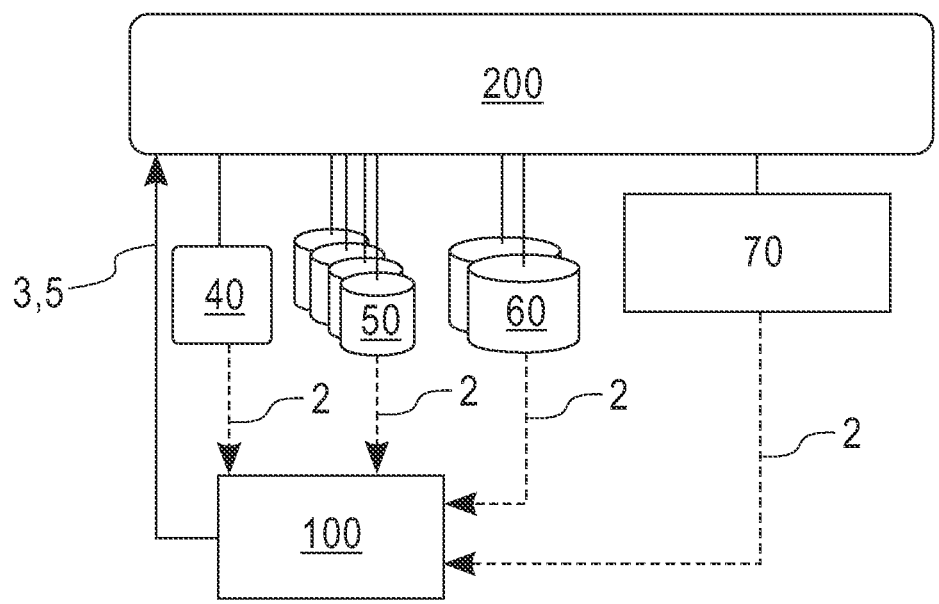
FIG. 2 shows an embodiment of a tiered storage system including the device of FIG. 1.

FIG. 2 shows an embodiment of a tiered storage system 200 including the device 100 of FIG. 1.

The storage system 200 consists of a plurality of storage tiers. Each storage tier includes of at least one storage device 40, 50, 60, 70, wherein one storage tier includes only one kind of storage devices 40, 50, 60, 70. As shown in FIG. 2, the storage devices 40, 50, 60, 70 can be for instance SSD devices 40, high-end disks 50, low-end disks 60 or any other kind of storage devices 70 like tape drives.

The device 100 of FIG. 1 receives the characteristics 2 of the different storage devices 40, 50, 60, 70 from the tiered storage system 200 and determines a number 5 of storage devices 40, 50, 60, 70 and the kind of storage device 40, 50, 60, 70 for each tier. Further, the device 100 also determines the data-to-storage-device assignment 3 and provides the assignment 3 as well as the number 5 of storage devices 40, 50, 60, 70 to the tiered storage system 200.

Based on this information, the tiered storage system 200 can be composed of an appropriate and optimized number 5 of storage devices 40, 50, 60, 70 per storage tier. The dimensioning of the number 5 of storage devices 40, 50, 60, 70 and the data-to-storage-device assignment 3 can be optimized on different characteristics 1 of the data like data unit size, average request size or average request rate as well as on different characteristics 2 of the storage devices 40, 50, 60, 70 like storage capacity, bandwidth for serving requests on the storage device 40, 50, 60, 70 or seek time.

Figure 3:
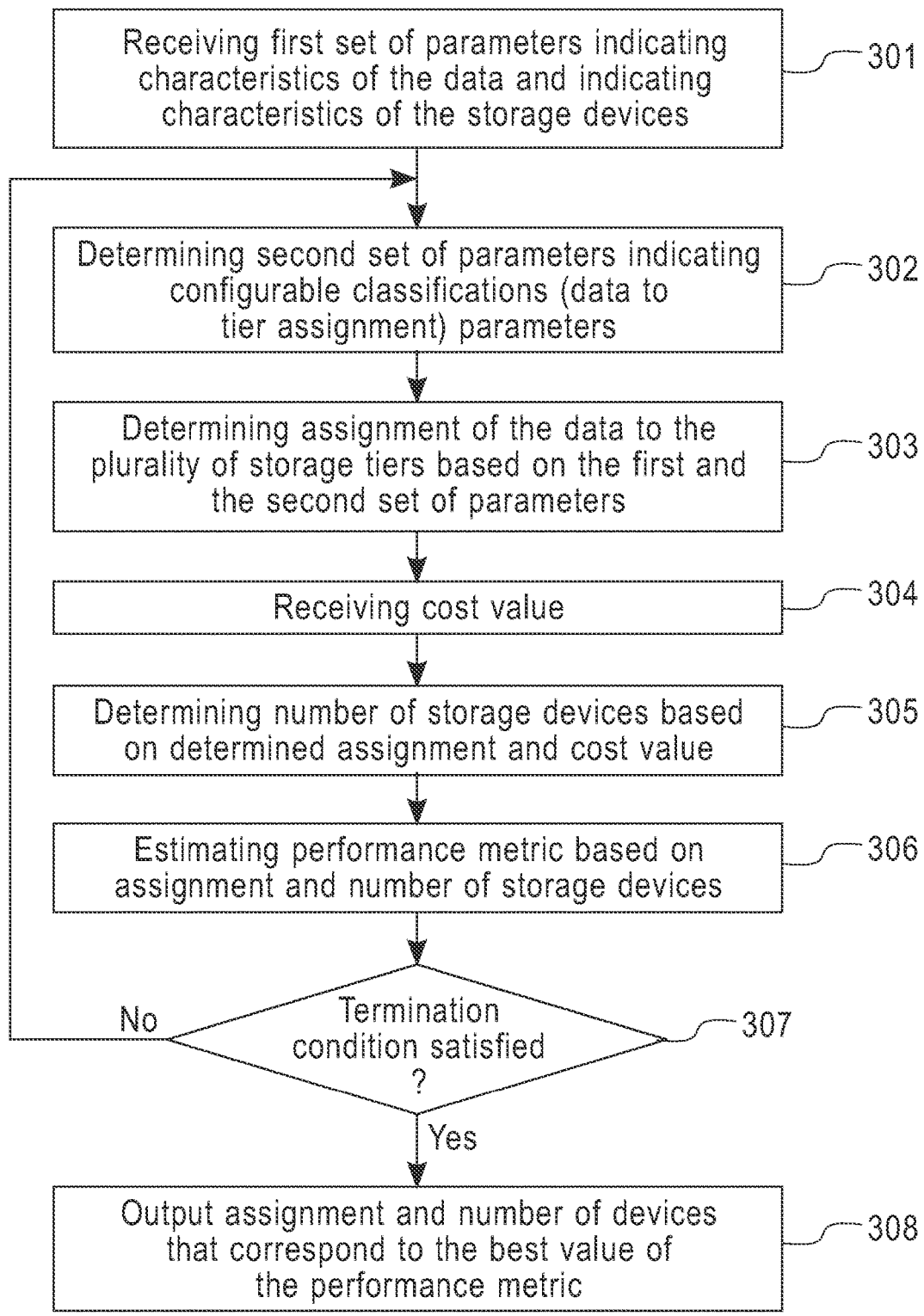
FIG. 3 shows an embodiment of a sequence of method steps for determining a number of storage devices for each of a plurality of storage tiers of a tiered storage system and for determining an assignment of data to be stored in the plurality of storage tiers.

FIG. 3 shows a sequence of method steps for determining a number 5 of storage devices 40, 50, 60, 70 for each of a plurality of storage tiers of a tiered storage system 200 and for determining an assignment 3 of data to be stored in the plurality of storage tiers. The method of FIG. 3 has the following steps 301 to 308. In a first step 301, a first set of parameters 1, 2 indicating characteristics 1 of the data to be stored and indicating characteristics 2 of the storage devices 40, 50, 60, 70 is received. In a second step 302, a second set of parameters 7 indicating configurable classification (data to tier assignment) parameters is determined (initialized). In a third step 303, an assignment 3 of the data to the plurality of storage tiers is determined based on the first set of parameters 1, 2 and the second set of parameters 7. In a forth step 304, a cost value 4 is received. In a fifth step 305, a number 5 of storage devices 40, 50, 60, 70 for each of the plurality of storage tiers is determined based on the determined assignment 3, the received cost value 4, and a performance metric of interest. In a sixth step 306, the performance metric value 6 is estimated based on the determined assignment 3 and the determined number 5 of storage devices 40, 50, 60, 70. In a seventh step 307, the termination condition is checked. If the termination is not satisfied, the steps 302 to 307 are repeated, else the final step 308 is executed. In a repeated second step 302, a second set of parameters 7 indicating configurable classification (data to tier assignment) parameters is determined again (updated). For updating the second set of parameters 7, the estimated performance metric value 6 can be used when available. In the final step 308, the method outputs the optimized assignment 3 of the data to the plurality of storage tiers and the optimized number 5 of storage devices 40, 50, 60, 70 for each of the plurality of storage tiers that correspond to the best observed value 6 of the performance metric, as well as the estimated performance metric value 6.

Computerized devices can be suitably designed for implementing embodiments of the present invention as described herein. In that respect, it can be appreciated that the method described herein are largely non-interactive and automated. In exemplary embodiments, the method described herein can be implemented either in an interactive, partly-interactive or non-interactive system. The method described herein can be implemented in software (e.g., firmware), hardware, or a combination thereof. In exemplary embodiments, the method described herein is implemented in software, as an executable program, the latter executed by suitable digital processing devices. In further exemplary embodiments, at least one step or all steps of above method of FIG. 3 can be implemented in software, as an executable program, the latter executed by suitable digital processing devices. More generally, embodiments of the present invention can be implemented wherein general-purpose digital computers, such as personal computers, workstations, etc., are used.

Figure 4:
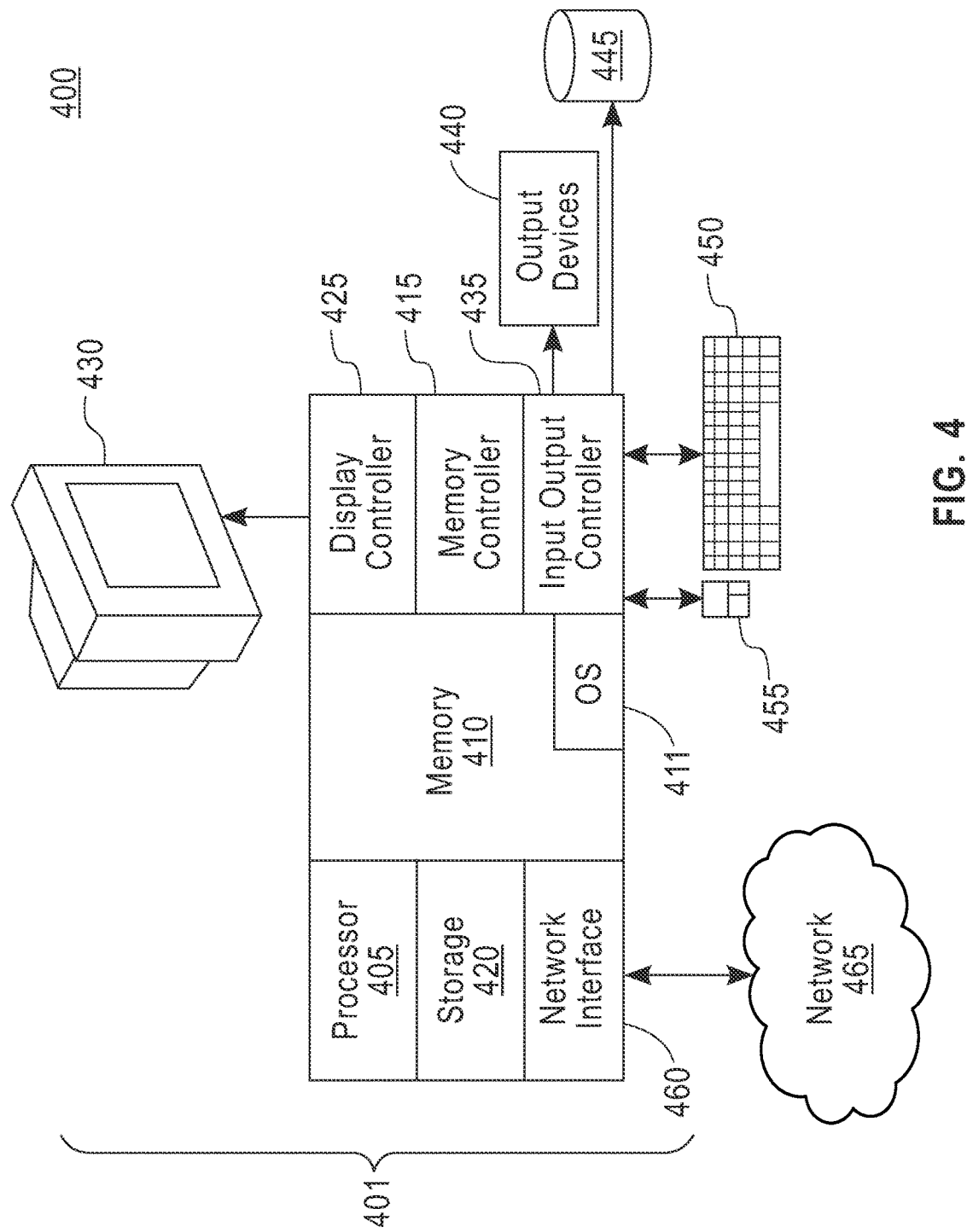
FIG. 4 shows a schematic block diagram of an embodiment of a system adapted for performing the method of FIG. 3.

For instance, the system 400 depicted in FIG. 4 schematically represents a computerized unit 401, e.g., a general-purpose computer. In exemplary embodiments, in terms of hardware architecture, as shown in FIG. 4, the unit 401 includes a processor 405, memory 410 coupled to a memory controller 415, and at least one input and/or output (I/O) device 440, 445, 450, 455 (or peripherals) that are communicatively coupled via a local input/output controller 435. Further, the input/output controller 435 can be, but is not limited to, at least one bus or other wired or wireless connections. The input/output controller 435 can have additional elements, which are omitted for simplicity, such as controllers, buffers (caches), drivers, repeaters, and receivers, to enable communications. Further, the local interface can include address, control, and/or data connections to enable appropriate communications among the aforementioned components.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), or generally any device for executing software instructions.

The memory 410 can include any one or combination of volatile memory elements (e.g., random access memory) and nonvolatile memory elements. Moreover, the memory 410 can incorporate electronic, magnetic, optical, and/or other types of storage media. Note that the memory 410 can have a distributed architecture, where various components are situated remote from one another, but can be accessed by the processor 405.

The software in memory 410 can include at least one separate program, each of which includes an ordered listing of executable instructions for implementing logical functions. In the example of FIG. 4, the software in the memory 410 includes a method described herein in accordance with exemplary embodiments and a suitable operating system (OS) 411. The OS 411 essentially controls the execution of other computer programs, such as the method as described herein (e.g., FIG. 3), and provides scheduling, input-output control, file and data management, memory management, and communication control and related services.

The methods described herein can be in the form of a source program, executable program (object code), script, or any other entity including a set of instructions to be performed. When in a source program form, then the program needs to be translated via a compiler, assembler, interpreter, or the like, as known per se, which can be included within the memory 410, so as to operate properly in connection with the OS 411. Furthermore, the methods can be written as an object oriented programming language, which has classes of data and methods, or a procedure programming language, which has routines, subroutines, and/or functions.

A conventional keyboard 450 and mouse 455 can be coupled to the input/output controller 435. Other I/O devices 440 through 455 can include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 435 for further processing. Sensor nodes are ideally small, consume low energy, are autonomous and operate unattended.

In addition, the I/O devices 440 through 455 can further include devices that communicate both inputs and outputs. The system 400 can further include a display controller 425 coupled to a display 430. In exemplary embodiments, the system 400 can further include a network interface or transceiver 460 for coupling to a network 465.

The network 465 transmits and receives data between the unit 401 and external systems. The network 465 is possibly implemented in a wireless fashion, e.g., using wireless protocols and technologies, such as WiFi, WiMax, etc. The network 465 can be a fixed wireless network, a wireless local area network (LAN), a wireless wide area network (WAN) a personal area network (PAN), a virtual private network (VPN), intranet or other suitable network system and includes equipment for receiving and transmitting signals.

The network 465 can also be an IP-based network for communication between the unit 401 and any external server, client and the like via a broadband connection. In exemplary embodiments, network 465 can be a managed IP network administered by a service provider. Besides, the network 465 can be a packet-switched network such as a LAN, WAN, and Internet network.

If the unit 401 is a PC, workstation, intelligent device or the like, the software in the memory 410 can further include a basic input output system (BIOS). The BIOS is stored in ROM so that the BIOS can be executed when the computer 401 is activated.

When the unit 401 is in operation, the processor 405 is configured to execute software stored within the memory 410, to communicate data to and from the memory 410, and to generally control operations of the computer 401 pursuant to the software. The method described herein and the OS 411, in whole or in part are read by the processor 405, typically buffered within the processor 405, and then executed. When the method described herein (e.g. with reference to FIG. 3) is implemented in software, the method can be stored on any computer readable medium, such as storage 420, for use by or in connection with any computer related system or method.

The present invention can be a system, a method, and/or a computer program product. The computer program product can include a computer readable storage medium (or media) having computer readable program instructions thereon for causing a processor to carry out aspects of the present invention.

Embodiments of the present device can first transform the original tiered storage dimensioning and placement optimization problem into a parameterized data classification problem, and then to determine the classification parameters that optimize a chosen system performance metric. This leads to a solution that jointly optimizes the tier dimensioning and the data to tier placement for the performance metric of interest.

The term storage device in this context can refer to a hardware unit that stores data. Examples of storage devices are solid state drives (SSDs), hard disk drives (HDDs), and tapes equipped with tape drives or tape libraries. Solid state drive (SSD) devices have a high price per unit of storage capacity, low seek time, and high write and/and read bandwidth. In general, due to extremely low seek time and high price per unit of storage capacity, SSDs are most suitable for storing data with random (non-sequential), frequent and short requests, or requests that require very short service time. Hard disk drive (HDD) devices have a medium price per unit of storage capacity, medium seek time, and medium write and/or read bandwidth. In general, HDDs are most suitable for storing data having a mix of random and sequential requests, or request that do not tolerate very long but do not require extremely short first-byte response time. Tape devices have a low price per unit of storage capacity and high write and/or read bandwidth, but large seek time. In general, a tape based storage is most suitable for storing infrequently accessed data with sequential requests that tolerate first-byte response time to be in the order of 10s or 100s of seconds.

The term tiered storage system in this context denotes a storage system including multiple storage devices that are grouped together in tiers in order to provide enough space and good I/O performance for large amounts of data. The term storage tier in this context denotes a group of homogeneous storage devices.

Data stored onto storage devices can be organized into logical blocks of bytes, e.g. 4 KB data blocks. A data unit is a collection of data blocks that are treated as one unit when deciding on which tier to store them or when collecting statistics about data reads and/or writes. Data chunk, or simply chunk, is an alternative term that can also be used. Data units can be of fixed size, e.g. consisting of 1 GB of consecutive data blocks. Data units can also be of a variable size, and in particular each file can be considered as a data unit.

Dimensioning a tiered storage system in this context means determining the number of storage devices for each of its considered tiers. Data to tier placement in a tiered storage system is the assignment of each data unit to a storage tier.

In a device according to embodiments of the invention, a reconfigurable classifier is used for the data-to-tier assignment that jointly takes into consideration the data characteristics and available device characteristics. The dimensioning unit further takes into account a cost value. In addition, the classifier reconfiguration unit takes into account a storage system performance metric, which is determined by the dimensioning unit and which is to be optimized. The output of the classifier reconfiguration unit, i.e. the second set of parameters which can take into account the previous values of the performance metric when available, is input to the reconfigurable classifier unit. Consequently, the reconfigurable classifier unit adapts the assignment of the data to the plurality of storage tiers based on the data characteristics, the storage device characteristics, the cost value and the performance metric. Thus, a dimensioning of the number of devices per tier as well as a dimensioning of the data-to-tier assignment is carried out which can take into account several characteristics of the tiered storage system, the data and a cost value.

In an embodiment, the characteristics of the data to be stored include at least one of a data unit size, an average request size, and an average request rate. Data units can be characterized by their size, the rate of data requests (read or write) to that data unit, the average value and distribution of the sizes of data request to that data unit, and the sequencing of the requests. Hereby, the data workload is defined as a set of data units and their characteristics that needs to be handled by a storage system. In addition to observing and characterizing existing workloads, workloads can also be predicted, forecasted, or synthetic workloads can be created, simulated, or modelled for the storage system design and performance evaluation purposes. The workload can be used as part of the first set of parameters.

In a further embodiment, the characteristics of the storage devices include at least one of a storage capacity, a bandwidth for servicing requests on the storage device, and a seek time.

Regarding performance, storage devices can be characterized by the average seek time and read and write bandwidth. The device seek time can be defined as the time needed to position or prepare the device for reading or writing data. The amount of data read/written per time unit once the device is positioned or prepared can be denoted as the device read/write bandwidth. Another characteristic of a storage device can be the price per unit of storage capacity it provides.

In a further embodiment, the number of storage devices assigned to one storage tier consists of identical storage devices. In particular one storage tier includes only one kind of storage device. Different storage tiers can consist of the same kind of storage device, but can also consist of different storage devices.

In a further embodiment, the performance metric includes at least one of a bandwidth for servicing requests on one storage tier, and a seek time on one storage tier. The performance metric, i.e. the tiered storage system performance metric, can be a measure used to characterize the behavior of the storage system when storing or accessing data. Different kinds of performance metrics can be used. The performance metric can be a performance metric of one tier, of all storage tiers or the overall storage system.

The performance metric can be for example the tiered storage system average request response time (for reads, for writes, or overall). Alternative performance metrics can be the storage system average request response time weighted by the request size, the storage system average request queuing time, and the storage system load defined as the percentage of time that the storage system resources are busy serving requests.

In a further embodiment, the reconfigurable classifier unit is configured to perform a utility function based on the first set of parameters and the second set of parameters.

The utility function can be used to determine the data-to-tier assignment. The specific terms of the utility function can depend on which performance metric is used. For instance, when the storage system average response time is used as performance metric, the first term of the utility function can be the storage cost of a data unit on a tier, and a second term can represent the load this data unit creates on a device in that tier.

In a further embodiment, the second set of parameters includes, e.g. can be used as, weighting factors for weighting terms of the utility function. A utility function could be for example: $Uk(q, r, v) = -\beta k*[(1-\alpha k)*v/Vk + \alpha k*r*(sk+q/bk)]$, where K is the number of tiers, $k=1, \ldots, K$ is the tier index, Uk is the utility function on tier k, q is the average size of data requests to data unit [KB], r is the rate of data requests to data unit [1/s], v is the volume (size in Bytes) of data unit [GB], Vk is the storage capacity of a device on tier k, sk is the seek time on tier k [seconds], bk is the bandwidth for servicing requests on tier k [MB/s], $\alpha k$ and $\beta k$ are configuration parameters of the reconfigurable classifier unit provided by the classifier reconfiguration unit. $\alpha k$ and $\beta k$ are used for weighting different terms of the utility function.

Parameterizing the utility function ($\alpha k, \beta k$), and therefore parameterizing the reconfigurable classifier unit, allows to implicitly control the resulting relative sizing and queuing among the storage tiers, and therefore to control and optimize the system average response time. The $\alpha k$ parameter can weight relative demands between device storage capabilities and device IO operations (number of read and write requests that can be served per second) capabilities within a tier. A larger $\alpha k$ value emphasizes the need for IO which in turn impacts the load and queuing of request on device, which allows to iteratively determine a good $\alpha k$ value that optimizes queuing and therefore the response time in the system. The $\beta k$ parameter can weight the preference between the tiers and allow the solution to be optimized with respect to the cost value, for instance a budget constraint. Decreasing $\beta k$ for a tier implies more data units to be put on that tier, but the overall combination of $\alpha k$ and $\beta k$ values determines which data go to which tier.

For each value of the second set of parameters, the data unit to tier assignment is deterministic, and the corresponding optimal dimensioning with respect to a system performance metric (e.g. average response time) becomes a tractable problem. Because the number of tiers can be small, exploring the space of applicable values of the second set of parameters is also feasible, and in some cases exploring the space can be replaced by a faster iterative and adaptive procedure. Thus it can be feasible to determine an optimized second set of parameters (an optimized classifier configuration) and the corresponding optimized data placement and tier dimensioning as well as the value of the optimized system performance metric.

In a further embodiment, the reconfigurable classifier unit is configured to assign each data unit of the data to be stored to the storage tier of the plurality of storage tiers having the maximum value of the utility function for that data unit.

The reconfigurable classifier unit assigns each data unit to the tier having the best value of the utility function for that data unit. A utility value of the function is efficient if it is larger. Thus, the absolute value as a generalized cost is smaller. The utility function can be computed for different tiers and the results can be compared with each other to determine the best or maximum value.

In a further embodiment, the utility function includes at least a term representing costs for storing one data unit of the data and a term representing the load this unit provides to the storage tier. Based on such terms, an optimized data-to-tier assignment and an optimized number of storage devices per tier can be determined.

The costs for storing the data can be denoted as storage system cost. The storage system cost can be the cost of purchasing and operating the storage system. The cost can be related to a certain time period of operating and using the system. The various costs incurred during that period can be expressed per device, so the storage system cost for that period can be expressed by the sum of total costs of the used devices.

In a further embodiment, the reconfigurable classifier unit, the dimensioning unit and the classifier reconfiguration unit provide (or form) a control loop for determining the assignment of the data to the plurality of storage tiers.

The control loop can perform the following steps:
a) configuring or reconfiguring parameters of the reconfigurable classifier unit by the classifier reconfiguration unit;
b) classifying data units using the reconfigurable classifier unit and its parameters configured in step a), by having the reconfigurable classifier unit receiving as input the workload characteristics of the data to be stored in the system and the storage device characteristics and produces as output the tier in which to place each data unit;
c) determining the optimal number of storage devices in each tier using the dimensioning unit which receives as input the data unit to tier assignment as determined by the reconfigurable classifier unit in step b) and a cost value, for instance a cost budget, for the system, and produces as output the number of devices for each tier and the estimated performance of the system in a predetermined metric;
d) repeating the steps a) through c) for different values of the reconfigurable classifier unit parameters;
e) outputting as the optimal result the number of devices in each tier and the data placement that corresponds to the best value of the estimated performance metric found in step d).

In a further embodiment, the classifier reconfiguration unit is configured to determine whether the estimated performance metric fulfills a termination condition of the control loop.

Above step d) can be a loop that explores a predetermined and discretized space of the reconfigurable classifier unit parameters, or it can be an iterative procedure that updates the reconfigurable classifier unit parameters adaptively based on previous values of the reconfigurable classifier unit parameters and the corresponding values of the estimated performance until a further improvement of the value of the estimated performance is below a threshold for a number of iterations, representing the exemplary termination condition. Another termination conditions can be used.

The classifier reconfiguration unit is adapted to newly generate the second set of parameters or to update the second set of parameters. Based on the newly generated or updated second set of parameters, the reconfigurable classifier unit updates the assignment of the data to the plurality of storage tiers and the dimensioning unit updates the number of storage devices for each of the plurality of storage tiers as well as the estimate of the performance metric. In order to optimize the performance metric and therefore the system dimensioning and data placement, the space of the second set of parameters, i.e. the classifier unit configuration parameters, is explored iteratively and by taking into account the estimated performance metric values from the previous iteration or iterations when available, until a termination condition is satisfied. An example of the termination condition is the performance metric improvement being below a first threshold for a number of consecutive iterations larger than a second threshold. Alternatively, the space of the second set of parameters (the classifier unit configuration parameters) is explored in parallel with or without taking into account the estimated performance metric values from the previous iterations, and then the system dimensioning and data placement are chosen that correspond to the second set of parameters resulting in the best performance metric value.

The range of the reconfigurable classifier unit parameters to be considered for the optimization can be determined in different ways. A manual control can be used by a user to choose the maximum values of each parameter based on his understanding of the utility function and meaning of the parameters, and to choose the step used for discretization of the reconfigurable classifier unit parameters. Alternatively, an automated procedure can be used for determining maximum value of the reconfigurable classifier unit parameters. In a single parameter case, a binary search can be used to determine the maximum value beyond which data unit to tier assignment does not change or does not change significantly.

In a further embodiment, the classifier reconfiguration unit is configured to output a signal indicating that the termination condition is fulfilled. The signal can be used to inform the tiered storage system how many storage devices are needed per tier and which data are to be stored in which tier.

Any embodiment of the first aspect can be combined with any embodiment of the first aspect to obtain another embodiment of the first aspect.

According to another embodiment, a tiered storage system is suggested. The tiered storage system includes a plurality of storage tiers each including a number of storage devices, and a device of the above mentioned first aspect for determining the number of storage devices for each of the plurality of storage tiers and for determining an assignment of data to be stored in the plurality of storage tiers.

The method can further includes updating the assignment of the data to the plurality of storage tiers and number of storage devices for each of the plurality of storage tiers and the performance metric value until a termination condition is satisfied. An example of the termination condition is the performance metric improvement being below a first threshold for a number of consecutive iterations larger than a second threshold. Alternatively, the space of the second set of parameters (the classifier unit configuration parameters) is explored in parallel with or without taking into account the estimated performance metric values from the previous iterations, and then the system dimensioning and data placement are chosen that correspond to the second set of parameters resulting in the best performance metric value.

According to another embodiment, the invention relates to a computer program product or computer program including a program code for executing at least one step of the method of the third aspect for determining a number of storage devices for each of a plurality of storage tiers of a tiered storage system and for determining an assignment of data to be stored in the plurality of storage tiers when run on at least one computer.

According to an embodiment of a fourth aspect, the invention relates to a computer program product or computer program including a program code for executing at least one step of the method of the previous embodiment for determining a number of storage devices for each of a plurality of storage tiers of a tiered storage system and for determining an assignment of data to be stored in the plurality of storage tiers when run on at least one computer.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming languages such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes at least one executable instruction for implementing the specified logical function(s). In some alternative implementations, the functions noted in the block can occur out of the order noted in the figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Generally, while the present invention has been described with reference to certain embodiments, it will be understood by those skilled in the art that various changes can be made and equivalents can be substituted without departing from the scope of the present invention. In addition, many modifications can be made to adapt a particular situation to the teachings of the present invention without departing from its scope. Therefore, it is intended that the present invention not be limited to the particular embodiments disclosed, but that the present invention will include all embodiments falling within the scope of the appended claims.

What is claimed is:

1. A device for determining a number of storage devices for each of a plurality of storage tiers of a tiered storage system and for determining an assignment of data to be stored in the plurality of storage tiers, the device comprising:
   a processor device executing instructions stored in a memory, wherein when executed, the instructions cause the processor device:
   to receive a first set of parameters indicating characteristics of the data to be stored and characteristics of the storage devices and a second set of parameters indicating classifier unit configuration parameters, and to determine an assignment of the data to the plurality of storage tiers based on the first set of parameters and the second set of parameters;
   to receive a cost value representing a predefined monetary budget;
   to determine the number of storage devices for each of the plurality of storage tiers based on the determined assignment, the received cost value including storage system acquisition and operating costs, and a performance metric; wherein the received cost value including the storage system acquisition and operating costs further includes generating a storage system cost associated with a certain time period of operating the tiered storage system, the storage system cost including various costs incurred during the certain time period expressed on a per-device level of the number of storage devices, such that the storage system cost for the certain time period is expressed by a sum of the various costs as incurred by the number of storage devices used at the per-device level; and wherein the various costs incurred by the number of storage devices include a first cost for a solid state tier, a second cost for a hard disk tier, and a third cost for a tape device tier of the tiered storage system, the first, second and third costs aggregated together to comprise the sum of the various costs;
   to estimate a value of the performance metric based on a determined assignment and the determined number of storage devices;
   to determine the second set of parameters and to provide the second set of parameters to a reconfigurable classifier unit, wherein the reconfigurable classifier unit is configured to adapt the determined assignment of the data to the plurality of storage tiers based on the first set of parameters and the second set of parameters; and
   to perform a utility function based on the first set of parameters and the second set of parameters; wherein the utility function is expressed as: $U_k(q, r, v) = -\beta_k * [(1-\alpha_k)*v/V_k + \alpha_k * r*(s_k + q/b_k)]$, where K is a number of the plurality of storage tiers, k=1, ..., K is a tier index, $U_k$ is the utility function on tier k, q is an average size of data requests to data unit, r is a rate of data requests to data unit, v is a volume size of the data unit, Vk is a storage capacity of a respective storage device on tier k, sk is a seek time on tier k, bk is a bandwidth for servicing requests on tier k, and αk and βk are configuration parameters of the reconfigurable classifier unit provided by a classifier reconfiguration unit.

2. The device of claim 1, wherein the characteristics of the data to be stored include at least one of a data unit size, an average request size, and an average request rate.

3. The device of claim 1, wherein the characteristics of the storage devices include at least one of a storage capacity, a bandwidth for servicing requests on the storage device, and a seek time.

4. The device of 1, wherein the number of storage devices assigned to one storage tier consists of identical storage devices.

5. The device of claim 1, wherein the processor device is configured to assign each data unit of the data to be stored to the storage tier of the plurality of storage tiers having the maximum value of the utility function for that data unit.

6. The device of claim 1, wherein the processor device uses the received set of first parameters, the received cost value, and the determined set of second parameters to provide a control loop for determining the assignment of the data to the plurality of storage tiers.

7. The device of claim 6, wherein the processor device is configured to determine whether an estimated performance metric fulfills a termination condition of the control loop.

8. The device of claim 7, wherein the processor device is configured to output a signal indicating that the termination condition is fulfilled.

9. A method for determining a number of storage devices for each of a plurality of storage tiers of a tiered storage system and for determining an assignment of data to be stored in the plurality of storage tiers, by a processor device, the method comprising:

receiving a first set of parameters indicating characteristics of the data to be stored and indicating characteristics of the storage devices;

determining a second set of parameters indicating classifier unit configuration parameters;

determining an assignment of the data to the plurality of storage tiers based on the first set of parameters and the second set of parameters;

receiving a cost value representing a predefined monetary budget;

determining a number of storage devices for each of the plurality of storage tiers based on the determined assignment, the received cost value including storage system acquisition and operating costs, and a performance metric; wherein the received cost value including the storage system acquisition and operating costs further includes generating a storage system cost associated with a certain time period of operating the tiered storage system, the storage system cost including various costs incurred during the certain time period expressed on a per-device level of the number of storage devices, such that the storage system cost for the certain time period is expressed by a sum of the various costs as incurred by the number of storage devices used at the per-device level; and wherein the various costs incurred by the number of storage devices include a first cost for a solid state tier, a second cost for a hard disk tier, and a third cost for a tape device tier of the tiered storage system, the first, second and third costs aggregated together to comprise the sum of the various costs;

estimating a value of the performance metric based on the determined assignment and the determined number of storage devices;

determining the second set of parameters;

providing the second set of parameters to a reconfigurable classifier unit;

adapting the determined assignment of the data to the plurality of storage tiers based on the first set of parameters and the second set of parameters; and performing a utility function based on the first set of parameters and the second set of parameters; wherein the utility function is expressed as: $U_k(q, r, v) = -\beta_k \cdot [(1-\alpha_k) \cdot v/V_k + \alpha_k \cdot r \cdot (s_k + q/b_k)]$, where K is a number of the plurality of storage tiers, k=1, ..., K is a tier index, Uk is the utility function on tier k, q is an average size of data requests to data unit, r is a rate of data requests to data unit, v is a volume size of the data unit, Vk is a storage capacity of a respective storage device on tier k, sk is a seek time on tier k, bk is a bandwidth for servicing requests on tier k, and αk and βk are configuration parameters of the reconfigurable classifier unit provided by a classifier reconfiguration unit.

10. A non-transitory computer program product comprising a program code for executing the steps of a method for determining a number of storage devices for each of a plurality of storage tiers of a tiered storage system and for determining an assignment of data to be stored in the plurality of storage tiers when run on at least one computer, by a processor device, the method comprising:

receiving a first set of parameters indicating characteristics of the data to be stored and indicating characteristics of the storage devices;

determining a second set of parameters indicating classifier unit configuration parameters;

determining an assignment of the data to the plurality of storage tiers based on the first set of parameters and the second set of parameters;

receiving a cost value representing a predefined monetary budget;

determining a number of storage devices for each of the plurality of storage tiers based on the determined assignment, the received cost value including storage system acquisition and operating costs, and a performance metric; wherein the received cost value including the storage system acquisition and operating costs further includes generating a storage system cost associated with a certain time period of operating the tiered storage system, the storage system cost including various costs incurred during the certain time period expressed on a per-device level of the number of storage devices, such that the storage system cost for the certain time period is expressed by a sum of the various costs as incurred by the number of storage devices used at the per-device level; and wherein the various costs incurred by the number of storage devices include a first cost for a solid state tier, a second cost for a hard disk tier, and a third cost for a tape device tier of the tiered storage system, the first, second and third costs aggregated together to comprise the sum of the various costs;

estimating a value of the performance metric based on the determined assignment and the determined number of storage devices;

determining the second set of parameters;

providing the second set of parameters to a reconfigurable classifier unit;

adapting the determined assignment of the data to the plurality of storage tiers based on the first set of parameters and the second set of parameters; and performing a utility function based on the first set of parameters and the second set of parameters; wherein the utility function is expressed as: $U_k(q, r, v) = -\beta_k * [(1-\alpha_k)*v/V_k + \alpha_k*r*(s_k+q/b_k)]$, where K is a number of the plurality of storage tiers, $k=1, \ldots, K$ is a tier index, $U_k$ is the utility function on tier k, q is an average size of data requests to data unit, r is a rate of data requests to data unit, v is a volume size of the data unit, $V_k$ is a storage capacity of a respective storage device on tier k, $s_k$ is a seek time on tier k, $b_k$ is a bandwidth for servicing requests on tier k, and $\alpha_k$ and $\beta_k$ are configuration parameters of the reconfigurable classifier unit provided by a classifier reconfiguration unit.

* * * * *